(12) United States Patent
Laurino (10) Patent No.: US 8,835,586 B2
(45) Date of Patent: Sep. 16, 2014

(54) POLYCARBONATE RESIN, POLY (2-OCTADECYL-BUTANEDIOIC ACID) AND THE SALTS AND ESTERS THEREOF

(76) Inventor: Joseph P. Laurino, Tampa, FL (US)

( * ) Notice: Subject to any disclaimer, the term of this patent is extended or adjusted under 35 U.S.C. 154(b) by 432 days.

(21) Appl. No.: 12/804,930

(22) Filed: Aug. 2, 2010

(65) Prior Publication Data

US 2010/0311938 A1    Dec. 9, 2010

Related U.S. Application Data

(62) Division of application No. 11/998,612, filed on Nov. 30, 2007, now Pat. No. 7,964,688.

(51) Int. Cl.
| | | |
|---|---|---|
| C08G 63/00 | (2006.01) | |
| C08G 61/00 | (2006.01) | |
| C08F 222/06 | (2006.01) | |
| C02F 1/68 | (2006.01) | |
| B01J 45/00 | (2006.01) | |
| C08F 222/02 | (2006.01) | |
| C02F 1/28 | (2006.01) | |
| C02F 101/20 | (2006.01) | |

(52) U.S. Cl.
CPC .......... *C02F 1/683* (2013.01); *C02F 1/285* (2013.01); *C02F 2101/20* (2013.01); *C08F 222/06* (2013.01); *B01J 45/00* (2013.01); *C08F 222/02* (2013.01)
USPC .......................................... 526/319; 528/272

(58) Field of Classification Search
USPC .......................................... 526/319; 528/272
See application file for complete search history.

(56) References Cited

U.S. PATENT DOCUMENTS

| 3,560,456 | A | * | 2/1971 | Heilman | 526/272 |
| 5,298,568 | A | * | 3/1994 | Suzuki | 525/327.6 |
| 2006/0084764 | A1 | * | 4/2006 | Hanna et al. | 525/242 |

FOREIGN PATENT DOCUMENTS

JP          05202234    *   8/1993  ............. C08G 63/00

OTHER PUBLICATIONS

McGlade et al ("Fluorescence Probe Studies of Aqueous Solution Interaction between Sodium Dodecyl Sulfate and Anionic Polyelectrolytes", Biomacromolecules 1987, 20, 1782-1786).*

* cited by examiner

*Primary Examiner* — Ling Choi
*Assistant Examiner* — Chun-Cheng Wang
(74) *Attorney, Agent, or Firm* — Edward P. Dutkiewicz (57) ABSTRACT

A Chelating agent comprising a polymer backbone. The polymer backbone has a plurality of carbon atoms. There are two carboxylate groups or carboxylic acid groups per repeating unit being coupled to separate carbon atoms of the backbone.

5 Claims, 2 Drawing Sheets

Alternate Synthesis of 2-Octadecyl-Butanedioic Acid Analogs

Polyester →(water, heat, base or acid)→ Polycarboxylate or Polycarboxylic acid

POLYCARBONATE RESIN, POLY (2-OCTADECYL-BUTANEDIOIC ACID) AND THE SALTS AND ESTERS THEREOF

RELATED PATENT APPLICATIONS

This application is a Divisional application, based upon U.S. Utility patent application Ser. No. 11/998,612 filed Nov. 30, 2007 and presently pending. Applicant claims the priority of the above referenced parent patent application.

RULE 1.78(F)(1) DISCLOSURE

The Applicant has not submitted a related pending or patented non-provisional application within two months of the filing date of this present application. The invention is made by a single inventor, so there are no other inventors to be disclosed. This application is not under assignment to any other person or entity at this time.

BACKGROUND OF THE INVENTION

1. Field of the Invention

The present invention relates to Poly(2-Octadecyl-Butanedioate) (and the corresponding acid, Poly(2-Octadecyl Butanedioic Acid)) and more particularly pertains to the use of Poly(2-Octadecyl-Butanedioate) and Poly(2-Octadecyl-Butanedioic Acid) as Chelating Compounds. The Method of Using Poly(2-Octadecyl-Butanedioate) and Poly(2-Octadecyl-Butanedioic Acid) for Chelating purposes is described herein.

2. Description of the Prior Art

The use of chelating agents is known in the prior art. More specifically, chelating agents previously devised and utilized for the purpose of binding heavy metals are known to consist basically of familiar, expected, and obvious structural configurations, and chemical compounds, notwithstanding the myriad of designs encompassed by the crowded prior art which has been developed for the fulfillment of countless objectives and requirements.

By way of example, compounds used to remove heavy metals from aqueous solutions can be classified in to two general categories, heterogeneous and homogeneous. Heterogeneous materials are insoluble in water and are characterized by slow binding kinetics and low adsorption capacities. Homogeneous materials are soluble in water, have high binding kinetics and relatively high adsorption capacities. For example, Geckeler K, Lange G, Eberhardt H, Bayer E authored Preparation and Application of Water-Soluble Polymer-Metal Complexes, found in Pure & Appl. Chem 52:1883-1905 (1980). These authors state that insoluble chelating resins have considerable disadvantages, such as reaction in heterogeneous phase and long contact times.

In general, there are three requirements with which polymers as chelating agents should comply; (1) sufficient solubilizing power of the constitutional repeating unit which provides water-solubility of the polymer complexes, (2) a great number of functional groups of the complexing agent for a high capacity, and (3) a high molecular weight which allows an easy separation by usual methods from the metal not bound to the polymer.

Water-solubility is provided by a high content of hydrophilic groups, e.g. amino, hydroxyl, carboxyl, amide and sulfonic acid groups, or hydrophilic units of the polymer backbone (ether or imino groups).

Bhattacharyya D, et al. in U.S. Pat. No. 6,544,418, teaches IERs (ion exchange resins), such as strong acid or weak acid cationic exchangers, have been used extensively to recover heavy metals and/or prepare high quality water. The typical theoretical capacity of these IERs is five meq/gram. This capacity is quite low. For Ni(II), a maximum uptake of only 0.15 grams of metal per gram of IER is possible. Several specific examples are given below.

Heterogeneous Separations

Chelating Resins

Park I H and Kim K M. authored Preparation of Chelating Resins Containing a Pair of Neighboring Carboxylic Acid Groups and the Adsorption Characteristics for Heavy Metal Ions. The article was published in Sep Sci and Tech, 40:2963-2986 (2005).

These authors reported adsorptivities of 0-52 mg metal/gram resin for their malonic acid polymer. The resins reported herein had adsorptivity (mg metal/gram resin), depending upon the carboxylic acid content, of:

1. Pb(II) 17.71-52.21
2. Hg(II) 9.62-40.26
3. Cu(II) 20.44-25.73
4. Cd(II) 17.19-46.88
5. Ni(II) 4.16-10.56
6. Co(II) 16.07-31.82
7. Cr(III) 0.00-2.25

The above results were obtained only after a very long incubation defined as 28 hr incubation at 20 degrees C. and a pH of 5.

Bruening, R L, et al., disclosed in International Patent Application Number PCT/US92/02730 the production of chelating polymers formed from polyalkylene-polyamine-polycarboxylic acid ligands covalently bonded through a spacer group to a silicon atom and further covalently bonded to a solid support.

The above series of polymers is different from that described in the current invention for several reasons.

(1) The carboxylate or carboxylic acid functional groups in the above series are not located on adjacent or nearly adjacent carbon atoms in the polymer backbone.

(2) The polymer backbone contains amine functionality. The non-bonding electron pairs located on these nitrogen atoms may contribute to the chelation ability of these polymers, and will contribute to the three-dimensional conformation of the polymer. Nitrogen atoms are not present in the polymer described in the current invention.

(3) The carboxylate or carboxylic acid groups are attached to the polymer backbone by pendent chains containing at least one carbon atom. The carboxylate or carboxylic acid groups in the polymer described in the current invention are directly attached to the polymer chain. (For the reported importance of pendent chains as described in the literature see Yamaguchi, U.S. Pat. No. 6,107,428 below.)

Unlike the prior art, the carboxylate or carboxylic acid groups in the current invention are directly attached to the polymer backbone. These carboxyl groups may be two, three, or four or more carbons away from each other on the backbone. This structure allows the backbone to potentially close on itself, forming a transient non-covalently-bound ring structure. In this way, the ring potentially determines the size of the molecule or ion that it can chelate within that ring. The larger the ring, the larger the molecule or ion. More importantly, the use of ring size to selectively determine the molecule or ion that will be chelated will allow the user to decide which molecule or ion it wishes to have chelated, leaving smaller or larger molecules or ions in the solution.

Hydrogels

Katime I. and Rodriguez E., authored Absorption of Metal Ions and Swelling Properties of Poly(Acrylic Acid—Co-Itaconic Acid) Hydrogels in J. Mactomol. Sci. —Pure Appl. Chem., A38(5&6), 543-558 (2001).

The above authors investigated the binding properties of insoluble hydrogels and found the process to be very slow, as polymer swelling for 100-1000 minutes is required prior to metal adsorption. Additionally, the rate is limited by metal diffusion inside the hydrogel and hydrogel-water interfacial area and desorption is slow, requiring 2 days in a 0.1M sulfuric acid solution.

Ion-Exchange Membrane

Sengupta S, and Sengupta A K. authored Characterizing a New Class of Sorptive/Desorptive Ion Exchange Membranes for Decontamination of Heavy-Metal-Laden Sludges. Their paper was published in Environ. Sci. Technol. 1993, 27, 2133-2140.

The authors produced selective chelating exchangers physically enmeshed or trapped in thin sheets of highly porous poly(tetrafluoroethylene) (PTFE).

A cation exchanger, having the chemical formula (R—$CH_2$—$N(CH_2COOH)_2$), contains nitrogen functionality.

The cation described above is crosslinked with divinylbenzene, making R the styrene monomer. The polymer matrix (R) is covalently attached to the chelating iminoacetate functional group.

In kinetic studies, $Pb^{+2}$ concentration went from 210 mg/L to 125 mg/L in 450-500 minutes (about 8 hours) indicating that this solid phase extraction is slow.

Bhattacharyya D, et al., in U.S. Pat. No. 6,544,418, described a method to prepare and regenerate a composite polymer and silica-based membrane. The researchers attached a polyamino acid to the silica-based membrane by reacting a terminal amine group of the polyamino acid with one of the epoxide groups on the membrane.

Capacity of these membranes in g Pb/g resin are as follows:
poly-L-aspartic acid=0.12;
poly-L-glutamic acid=0.30.

These capacity levels are approximately 10 times conventional ion-exchange/chelation sorbents. The authors stated that the polyamino acid functionalization is critical for this effect. The Incubation time is about 1-2 hours.

Films

Philipp W H, et al., in U.S. Pat. No. 5,371,110, discloses the production of films comprised of a poly(carboxylic acid) supported in a water insoluble polymer matrix poly(vinyl acetal). The polymer is made by treating a mixture made of poly(vinyl alcohol) and poly(acrylic acid) with a suitable aldehyde and an acid catalyst to cause acetalization with some cross-linking. The reaction with the aldehyde (1) locks in the poly(acrylic acid) so that the poly(carboxylic acid) can no linger be removed from the polymer by water and (2) makes the film insoluble in water (by cross-linking). The results are given below:

Initial [Pb]=16.37 ppm,
Final [Pb]=1.44 ppm (91% removal)
24 hour incubation.

Davis H, et al., in U.S. Pat. No. 3,872,001, developed a porous film capable of removing heavy metal pollutants from aqueous media. Reacted with the acid groups in the polymeric film backbone is a chelate (such as EDTA), capable of forming a complex with the heavy metal pollutants to be removed from the aqueous media.

The most preferred among the chelating agents is EDTA and this procedure removed from 55-95% of mercury and cadmium from the solution.

Biosorption

Davis T A, Volesky B, and Mucci A., in Water Research 37 (2003) 4311-4330, provide a review of the biochemistry of heavy metal biosorption by brown algae.

Brown algae biomass is a reliable and predictable way to remove $Pb^{+2}$, $Cu^{+2}$, $Cd^{+2}$ and $Zn^{+2}$ from aqueous solutions. This is due in part to the specific structural conformations of various polysaccharides in the algae. Without this specific structural arrangement, binding would not occur. Specifically, alginic acid or alginate, the salt of alginic acid, is the common name given to the family of linear polysaccharides containing 1,4-linked B-D-mannuronic (M) and alpha-L-guluronic (G) acid residues arranged in a non-regular, blockwise order along the chain. The residues typically occur as (-M-)n, (-G-)n and (-MG-)n sequences or blocks, where "n" is an integer. The carboxylic acid dissociation constants of M and G have been determined as pKa=3.38 and pKa 3.65, respectively, with similar pKa values for the polymers.

Polymannuronic acid is a flat ribbon-like chain, its molecular repeat unit contains two diequitorially linked beta-D mannuronic acid residues in the chair conformation. In contrast, poly guluronic acid contains two diaxially linked alpha-L-guluronic acid residues in the chair form which produces a rod-like polymer. This key difference in molecular conformation between the two homopolymeric blocks is believed to be chiefly responsible for the variable affinity of alginates for heavy metals.

The higher specificity of polyguluronic acid residues for divalent metals is explained by its "zigzag" structure which can accommodate the $Ca^{+2}$ (and other divalent cations) ion more easily. The alginates are thought to adopt an ordered solution network, through inter-chain dimerization of the polyguluronic sequences in the presence of calcium or other divalent cations of similar size. The rod-like shape of the poly-L-guluronic sections results in an alignment of two chain sections yielding an array of coordination sites, with cavities suitable for calcium and other divalent cations because they are lined with the carboxylate and other oxygen atoms of G residues. This description is known as the "egg-box" model.

With alginates, the preferential binding of heavier ions was attributed to stereochemical effects, since larger ions might better fit a binding site with two distant functional groups. Additionally, the key to binding in alginates appears to be the orientation of the oxygen atoms with respect to the —COO— group. In guluronic acid the ring oxygen and the axial 0-1 form a spatially favorable environment with —COO—, and opposed to the equatorial.

Homogeneous Separations

Water Soluble Polymers

Rivas B. L. and Pereira E. authored Functional Water Soluble Polymers with Ability to Bind Metal Ions, publishing their work in Macromol. Symp. 2004, 216, 65-76. Rivas B L. and Schiappacasse L N. authored Poly(acrylic acid-co-vinylsulfonic acid): Synthesis, Characterization, and Properties as Polychelatogen, publishing their work in J. Appl Polym Sci, 88: 1698-1704 (2003).

Water-soluble polymers (WSP) containing ligands at the main or side chains have been investigated for the removal of metal ions in the homogeneous phase. These chelating polymers are termed polychelatogens. The authors state that among the most important requirements for technological aspects of these polymers are their high solubility in water, easy and cheap route of synthesis, and adequate molecular weight and molecular weight distribution, chemical stability, high affinity for one or more metal ions, and the selectivity for the metal ion of interest.

Also taught is that polyelectrolytes may be distinguished from chelating polymers. The former have charged groups, or easily ionizable groups in aqueous solution, while the latter bears functional groups with the ability to form coordination bonds.

Membrane filtration processes can be successfully used for the separation of inorganic species and for their enrichment from dilute solutions with the aid of a water-soluble polymer. This technique is called the liquid-phase polymer based retention, or "LPR" technique.

The main features of a liquid-phase polymer-based retention system are a membrane filtration, reservoir and a pressure source, such as a nitrogen bottle.

Another separation technique involves the removal of metal ions from aqueous solutions by means of complexation with a water-soluble polymer followed by ultrafiltration (UF).

The kinetics of chelation may be time sensitive and require several hours, up to "overnight", depending upon the characteristics of the water-soluble polymer.

These water-soluble polymers form the most stable complexes at pH=5, retaining between 70-75% of Cu(II), Cd(II), Co(II), Ni(II), Zn(II), and Cr(III).

At high ionic strength (0.1M $NaNO_3$), for both Ni(II) and Cu(II), the polychelatogens show a low retention capacity (<10%). This can be explained by the shielding effect of the single electrolyte (in excess) on the charge of the polyion. By decreasing the single electrolyte concentration (0.01M $NaNO_3$), the behavior changes sharply (45-90% retention depending upon the ion).

Smith, et al., in U.S. Pat. No. 5,766,478, reported a water soluble polymer capable of binding with the target metal, where a polymer metal complex is formed and separated by ultrafiltration.

All polymers thus formed contained nitrogen functional groups or were crown ether derivatives. These polymers demonstrated a 30 minute incubation time.

The Limitations of Carboxylate and Carboxylic Acid Chelating Groups, as Described in the Literature Bhattacharyya D, et al. in U.S. Pat. No. 6,544,418, indicate that the polyamino group is a better chelator than the poly carboxylic acid group.

Various sorbents/ion exchange materials are available for metal ion sequestration. Unfortunately, however, all of these suffer from the disadvantage that they possess at most two or three functional groups capable of ion interaction per attachment site.

Capacity of these membranes in g Pb/g resin are as follows:
poly-L-aspartic acid=0.12;
poly-L-glutamic acid=0.30.

These capacities are approximately 10 times conventional ion-exchange/chelation sorbents. Authors state that the polyamino acid functionalization is critical for this effect.

Rivas B L, Pooley S A, Soto M, Aturana H A, Geckeler K E authored Poly(N,N'-dimethylacrylamide-co-acrylic acid): Synthesis, Characterization, and Application for the Removal and Separation of Inorganic Ions in Aqueous Solution, published in J. Appl Polym Sci 67: 93-100 (1998)

The authors indicate that the polyamino group is a better chelator than the polycarboxylic acid group, in that incorporation of amide functionality into a soluble poly carboxylic acid improved ion retention to 88-90% (from 60-70%) for all of the above ions except for Pb(II), which stayed at 50%.

W. F. McDonald, in U.S. Pat. No. 6,495,657, disclosed that polyamides are preferred over polycarboxylic acids for the binding of heavy metals. Polyamides are effective heavy metal catalysts because of the two-dimensional structure of the backbone. Amides are known to exist in a partial double bond configuration, thereby making the structure of the polymer backbone a series of two-dimensional planes with limited rotation between them. This structural configuration is said to enhance binding and utility. Furthermore, the patentee states that varying the amine used to form the amide can further alter the utility and binding characteristics of the polymer. In the current invention, the absence of nitrogen in the backbone prevents the formation of double bonds. All of the carbon bonds in the polymer backbone are able to freely rotate. The prior art above teaches that limiting conformations enhances binding and utility. In the current invention, increasing conformations is shown to enhance binding and utility.

Yamaguchi, in U.S. Pat. No. 6,107,428, discloses that carboxylic acid groups must have free rotation and not be inhibited by the polymer backbone in order to be effective chelators. Thus, these authors teach that the carboxylic acid group(s) can not be directly bonded to the polymer backbone.

In the polymers based on carboxylic acids produced by polymerizing a monomer of maleic acid or acrylic acid, a carboxyl group bonds directly to the main chain, and for this reason, the main chain inhibits free rotation of the carboxyl group. Thus, such polymers based on carboxylic acids render unsatisfactory ability in capturing metal ions, especially heavy metal ions. The authors found a polymer having the desired structure that is soluble in water and has a high ability to capture heavy metal ions. The monomer has a molecular structure having a plurality of carboxyl groups bonded away from the double bond. Accordingly, the polymer has a molecular structure including a plurality of carboxyl groups which are not directly bonded to the main chain, and for this reason, free rotation of carboxyl groups is not inhibited by the main chain. Thus, the polymer is soluble in water and compared with conventional chelating agents, renders an excellent dispersing effect on inorganic particles and a high ability to capture heavy metal ions.

Park I H. and Kim K M. authored Preparation of Chelating Resins Containing a Pair of Neighboring Carboxylic Acid Groups and the Adsorption Characteristics for Heavy Metal Ions, published in Sep Sci and Tech, 40:2963-2986 (2005). Authors state that better performance is obtained when the carboxylic acid groups are not directly bonded to the polymer backbone. In this study, two different kinds of short/long malonic acid pendant groups were added to a chelating polymer backbone in order to optimize the adsorptivity toward heavy metals. The authors prepared chelating resins containing a pair of carboxylic acid groups. In all cases, these were separated by a benzene ring and two methylene groups or two methylene groups from the polymer backbone. Additionally, both carboxylic acids were attached to the same carbon. The resins with spacer units among pendant chelating groups were more accessible for the adsorption of heavy metal ions than those without spacers, and the intervals between a pair of neighboring chelating groups had been also controlled for the effective adsorption of heavy metal ions. The adsorption capacities of chelating resins containing carboxylic acid groups toward heavy metal ions are generally low. The authors report optimal adsorption capacities of 18-52 mg/g for their poly carboxylic acids. This is significantly less than the 290 mg/g observed for the invented polymer.

Davis T A. Volesky B. and Mucci A. authored A Review of the Biochemistry of Heavy Metal Biosorption by Brown Algae, published in Water Research 37 (2003) 4311-4330. The authors state that the three-dimensional conformation of the chelator is important. The authors also state that functional groups responsible for the chelation should preferably be distant from each other. The higher specificity of polyguluronic acid residues for divalent metals is explained by its "zigzag" structure which can accommodate the $Ca^{+2}$ (and other divalent cations) ion more easily. The alginates are thought to adopt an ordered solution network, through inter-chain dimerization of the polyguluronic sequences in the presence of calcium or other divalent cations of similar size. The rod-like shape of the poly-L-guluronic sections results in an alignment of two chain sections yielding an array of coordination sites, with cavities suitable for calcium and other divalent cations because they are lined with the carboxylate and other oxygen atoms of G residues. This description is known as the "egg-box" model. With alginates, the preferential binding of heavier ions was attributed to stereochemical effects, since larger ions might better fit a binding site with two distant functional groups.

Park I-H. Rhee, J. M., and Jung, Y. S. authored Synthesis and Heavy Metal Ion Adsorptivity of Macroreticular Chelating Resins Containing Phosphono and Carboxylic Acid Groups, published in Die Angewandte Makromolekulare Chemie (1999) 27-34. The authors state that the adsorption ability of chelating resins containing only carboxylic acid groups toward heavy metals was very low. As a result, various improved resins containing dithiocarbamates, aminomethyl phosphoric acid groups, amidooximes, imidazoles, mercaptoamines, diphosphonates, and phosphono groups have been prepared. Adsorption capacities for these improved resins were still very low, only averaging about 2 mg/g resin. (By comparison, the polymer described in this invention had adsorption capacities 150 times greater.)

In summary, the characteristics of this polymer are not predicted by the literature and, as such, the use of the polymer to carry out chelation in the manner described, is unexpected, and constitutes a new and unexpected use for the polymer. Contrary to the literature that teaches that this polymer should not work in the manner shown empirically, it has been demonstrated that the polymer, as herein described, functions in a new, unanticipated manner.

While these compounds disclosed in the prior art fulfill their respective, particular objectives and requirements, the aforementioned patents and prior art do not describe the Chelating Compounds, and the Method of Use of Poly(2-Octadecyl-Butanedioate) and Poly(2-Octadecyl-Butanedioic Acid) that allows the use of re-usable compounds for binding and removing heavy metals from a solution.

In this respect, the Chelating Compounds, and Method of Use of Poly(2-Octadecyl-Butanedioate) and Poly(2-Octadecyl-Butanedioic Acid) according to the present invention substantially departs from the conventional concepts and compounds described in the prior art, and in doing so provides compounds primarily developed for the purpose of providing re-usable compounds for binding and removing heavy metals from a solution.

Therefore, it can be appreciated that there exists a continuing need for new and improved Chelating Compounds, and Method of Use of Poly(2-Octadecyl-Butanedioate) and Poly(2-Octadecyl-Butanedioic Acid) which can be used in a re-usable fashion for binding and removing heavy metals from a solution. In this regard, the present invention substantially fulfills this need.

SUMMARY OF THE INVENTION

Poly(2-octadecyl-butanedioate) and Poly(2-octadecyl-butane-dioic acid), prepared from polyanhydride PA-18 or other preparative means as would be evident to those skilled in the art, possess novel heavy metal adsorption characteristics. The adsorption capacity of this water insoluble polymer for lead (II) was substantially higher than other heterogeneous adsorbants and is equivalent to those obtained with homogeneous sorbants. Essential characteristics/benefits are summarized below.

First, the ease of separation of polymer from aqueous media (gravity filtration) becomes readily apparent, in that heterogeneous separation avoids the use of high pressure ultrafiltration associated with the separation of aqueous ion solutions and homogeneous sorbents. Also, extremely rapid adsorption of heavy metal ions occurs. Chelation kenetics result in a significantly faster adsorption, and adsorption capacity is significantly greater than that observed with other heterogeneous sorbents. The disclosed compounds have a highly efficient capacity for metal ions per unit weight of polymer. Adsorption capacity is similar to homogeneous sorbents. A sodium or potassium carboxylate form of chelation groups provides for a relatively large pH range for separations. Most sorbents release hydrogen ions upon metal chelation, constantly altering the pH of the solution. This tends to limit both the kinetics (speed) of the sorption reaction and the capacity of the sorbant. Chelation is not altered by high sodium ion concentration. The compound can be used in applications involving brine solutions, sea water, and urine. Many sorbants can not be used under solutions having a high sodium ion content. Heavy metal chelation can be accomplished in solutions with high calcium ion concentrations. The disclosed compound can be used in applications involving hard water. Because of the lower hydration energy associated with the calcium ion, when compared to heavy metals, almost all other sorbents preferentially bind calcium ions. This limits both the capacity and the utility of these sorbents.

All biosorbents suffer from lot-to-lot chemical variability and lack of widespread distribution, and procedures that affix polymers to insoluble supports are subject to significant variability. This impacts both polymer performance and production costs. This variability is absent in the current invention.

Lastly, the invented polymers are able to bind +1, +2, and +3 ions. This is advantageous, and unexpected, in that most polymers bind metals having only one or two different oxidation states.

Essential Characteristics of Polymers

The polymers, as herein described, contain numerous sodium (or potassium) carboxylate groups or carboxylic acid groups directly bound to the polymer backbone that provide the hydrophilic heavy metal binding characteristics. The polymers contain a water insoluble hydrophobic aliphatic polymer backbone. The lack of solubility of the polymers in water facilitates the ease of separation from aqueous solution. The polymers provide specific, selective, and fast complexation of heavy and other metal ions as well as demonstrating reusability of the chelating polymeric ligands.

Comparison of Adsorption Capacities

The absorption capacities of various absorbents is given in the table below:

| Adsorbent | Homogeneous/ Heterogeneous | Adsorption capacity (mg g$^{-1}$) | Ref. |
| --- | --- | --- | --- |
| These polymers | Heterogeneous | 290 | — |
| Banana Stem | Heterogeneous | 91.74 | 12 |
| Tin Oxide Gel | Heterogeneous | 16.3 | 7 |
| Sporopolleni | Heterogeneous | 8.52 | 22 |
| XAD-4 Copolymer Resin | Heterogeneous | 12.2 | 10 |
| Macroreticular Resins | Heterogeneous | 2.05 | 23 |
| Sargassum sp. | Heterogeneous | 244 | 5 |
| Poly-ethyleneimine | Homogeneous | 120-470 | 24 |

The polymers, herein described, have several potential uses that are beneficial. The polymers may be used for purification of drinking water, for treatment or isolation of hazardous waste, and for purification of groundwater. The polymers may also be used as a treatment of industrial discharge prior to release into the environment, or use as binding agents for paints to metal surfaces. The polymers may have use as chelating drugs to treat heavy metal/metal toxicity, and in mining operations to increase the isolation yield of metals found in low concentration.

In view of the foregoing disadvantages inherent in the known types of chelating agents now present in the prior art, the present invention provides improved Chelating Compounds, and Method of Use of Poly(2-Octadecyl-Butanedioate) and Poly(2-Octadecyl-Butanedioic Acid). As such, the general purpose of the present invention, which will be described subsequently in greater detail, is to provide a new and improved Chelating Compound, and Method of Use of Poly(2-Octadecyl-Butanedioate) and Poly(2-Octadecyl-Butanedioic Acid) and a method which has all the advantages of the prior art and none of the disadvantages.

To attain this, the present invention essentially comprises a Chelating agent comprising a polymer backbone. The backbone is a water insoluble, hydrophobic, aliphatic polymer structure. There are two sodium carboxylate groups or carboxylic acid groups per repeating unit that are directly bound to the polymer backbone.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other formulations, and methods for carrying out the several purposes of the present invention. It is important, therefore, that the claims be regarded as including such equivalent formulations insofar as they do not depart from the spirit and scope of the present invention.

It is therefore an object of the present invention to provide new and improved Chelating Compounds, and Method of Use of Poly(2-Octadecyl-Butanedioate) and Poly(2-Octadecyl-Butanedioic Acid) which has all of the advantages of the prior art chelating agents and none of the disadvantages.

It is another object of the present invention to provide new and improved Chelating Compounds, and Method of Use of Poly(2-Octadecyl-Butanedioate) and Poly(2-Octadecyl-Butanedioic Acid) which may be easily and efficiently manufactured and marketed.

It is further object of the present invention to provide new and improved Chelating Compounds, and Method of Use of Poly(2-Octadecyl-Butanedioate) and Poly(2-Octadecyl-Butanedioic Acid) which is easily reproduced.

An even further object of the present invention is to provide new and improved Chelating Compounds, and Method of Use of Poly(2-Octadecyl-Butanedioate) and Poly(2-Octadecyl-Butanedioic Acid) which is susceptible of a low cost of manufacture with regard to both materials and labor, and which accordingly is then susceptible of low prices of sale to the consuming public, thereby making such Chelating Compounds, and Method of Use of Poly(2-Octadecyl-Butanedioate) and Poly(2-Octadecyl-Butanedioic Acid) economically available to the buying public.

Even still another object of the present invention is to provide Chelating Compounds, and Method of Use of Poly(2-Octadecyl-Butanedioate) and Poly(2-Octadecyl-Butanedioic Acid) for the use of a re-usable compound for binding and removing heavy metals.

Lastly, it is an object of the present invention to provide a new and improved compound having chelation properties and being able to be regenerated from a chelated solution, allowing re-use of the compound.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
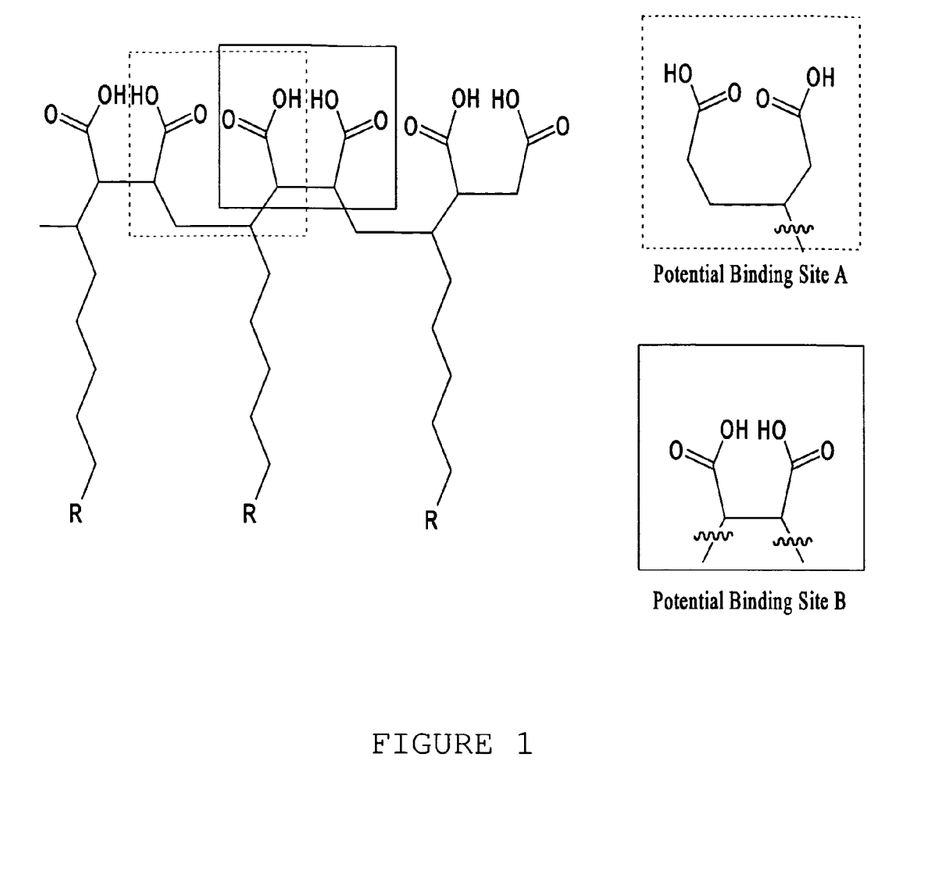
FIG. 1 is a drawing of the compound, showing the pertinent structure and formula.

With reference now to the drawings, and in particular to FIG. 1 thereof, the preferred embodiment of the new and improved Chelating Compound, and Method of Use of Poly(2-Octadecyl-Butanedioate, sodium) embodying the principles and concepts of the present invention and generally designated by the reference numeral 10 will be described. Simplistically stated, the polymer herein described comprises a plurality of reactive groups, being carboxylates or carboxylic acid groups. The reactive group is directly bonded to the carbon backbone.

The initial, or primary component, for the synthesis, is a commonly available, previously described component. The primary component may be prepared as follows:

1. The polycarboxylate is produced from the corresponding polyanhydride. The polyanhydride is produced by a process that is described and disclosed in U.S. Pat. No. 3,560,456, issued to S. M. Hazen and W. J. Heilman, entitled "Process of forming copolymers of maleic anhydride and an aliphatic olefin having from 16 to 18 carbon atoms."

2. The polycarboxylate is produced from the polyanhydride by the following procedure:

10 grams of the polyanhydride PA-18 are dissolved in 200 ml of 4M NaOH and stirred at 85° C. for 2 hours. The reaction mixture is cooled, the pH adjusted to 6 to 6.5, and vacuum filtered. The solid polymer is washed with cold analytical grade methanol and dried under vacuum.

There are other methods to produce the polycarboxylate. One method is to produce the polyester. Subsequent hydrolysis of the polyester would produce the polycarboxylate. These reaction schemes would be obvious to someone skilled in the art of organic synthesis or polymer synthesis.

The polycarboxylate has two different binding site populations. The reactive groups in the repeating unit are two carbons apart, while the reactive groups between the repeating units are four carbons apart. There is direct experimental evidence that these two binding sites have different metal chelation affinities. A number of different polycarboxylate polymers may be produced in this way. Polycarboxylate polymers with reactive groups in the repeating unit 4 carbons apart and between the repeating units 6 carbons apart and the corresponding polymer with 6 (within) and 8 (between), respectively can potentially form transient non-convalently bonded ring systems. One can enhance specificity by tailoring the polymer to fit the size of the metal ion one chooses to chelate. Additionally, the reactive groups must be attached to the backbone and do not have to be attached to adjacent carbon atoms. It is possible that the polymer chain, being flexible, is able to surround the metal, thereby enhancing chelation.

FIGURES

FIG. 1 shows the form of Poly(2-octadecyl-butanedioic acid) showing two potential binding sites.

FIG. 1 is the first configuration of the compound.

Figure 2:
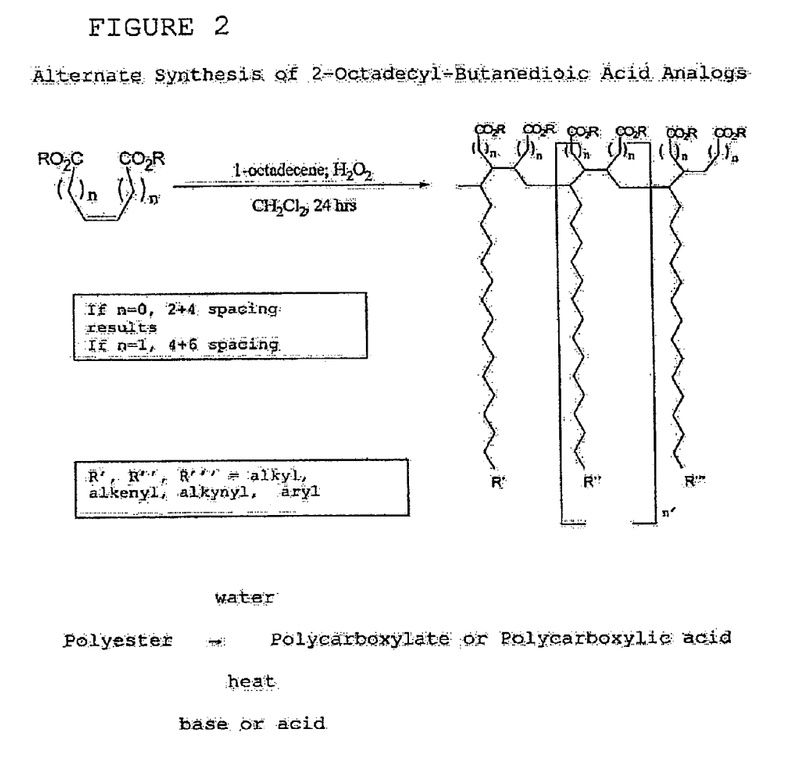
FIG. 2 is a drawing of Alternate Synthesis of 2-Octadecyl-Butanedioic Acid Analogs.

FIG. 2. shows an Alternate Synthesis of 2-Octadecyl-Butanedioic Acid Analog.

FIG. 2 is a second configuration of the compound. In the reaction sequence, R in both the reactants and products would be an aliphatic organic group, such as methyl or ethyl, making both the reactants and products esters. The product above could be further modified by hydrolysis of the ester in either basic or acidic media to produce the polycarboxylate or polycarboxylic acid, respectively. In the case of hydrolysis in basic media, if sodium hydroxide is used, the sodium salt of the polycarboxylate ion would be formed ($R=Na^+$). Likewise, if potassium hydroxide is used, the potassium salt of the polycarboxylate ion would result ($R=K^+$). If one does an acid catalyzed ester hydrolysis (acid is used in the second reaction above), then the polycarboxylic acid would be produced ($R=H$).

In these polymers, the carboxylates or carboxylic acid groups are separated by 0 to 8 carbon atoms.

Procedure for Metal Chelation

Batch sorption experiments were conducted by adding 0.0500 grams of the insoluble poly(2-octadecyl-butanedioate) or Poly(2-octadecyl-butanedioic acid) to 5.0 ml of a metal ion primary solution. The heterogeneous mixtures form a secondary solution and are agitated at 150 rpm at 22° C. for 15 to 60 minutes. The secondary solution is then gravity filtered. The filtered solution is then free of metal ions. The poly/metal ion complex is filtered out in the form of filter cakes containing the polymer and adsorbed metal ions.

Procedure to Recover Metal Ion from Polymer

A significant advantage of using the herein described polymer for metal chelation is that the polymer is recoverable after binding with the metal within a solution. By recoverable is meant that the polymer can then be processed and separated from the chelated metal, so that the polymer can then again be used to chelate a metal containing solution. Such recoverability means less overall cost, and less environmental impact, as by separating the polymer from the metal chelated structure, the metal is left, to be processed and recycled. Rather than filling landfills, the use of the polymer in the herein described method will allow a once hazardous substance to become a utilitarian substance and is a source of the metal ion.

The process for recovery is quite direct. After filtration, as described above, the solid filter cakes containing the polymer and adsorbed metal ions are suspended in a dilute acid solution. In the preferred embodiment the dilute acid solution is a 2% nitric acid ($HNO_3$) solution. The heterogeneous mixtures are stirred at approximately 150 rpm for 30 minutes. The sample is then gravity filtered. The filtrate contains the aqueous metal ion and the solid that is removed contains the poly, no longer in a poly/metal ion complex. The aqueous metal ion solution can then be treated with a dilute base to precipitate the metal ion out of solution, for recycling of the metal ion. The filter cake containing the recovered polymer, or poly, can then be reused in a chelation procedure as a source of poly.

Due to capacities of this and other adsorbents, the ratio of polymer to solution needs to be fairly constant. The polymer to solution ratio can, however, be varied by a factor of about 200, depending upon the metal ion concentration of the solution, and still achieve optimum results. Also variable is the shaking speed. While the preferred embodiment of the method uses a shaking speed of 150 revolutions per minute, the shaking speed may be varied from a few revolutions per minute to six hundred revolutions per minute.

Chelation purposes are uses such as, purification of drinking water, treatment or isolation of hazardous waste, purification of groundwater, the treatment of industrial discharge prior to release into the environment, as a binding agent for paints to metal surfaces, as a drug to treat heavy metal/metal toxicity, and as used in mining operations to increase the isolation yield of metals found in low concentration.

It should be noted that filtration may take place by use of a columnar filtering apparatus, in which the solution is passed through a filtering medium that is contained within a column. Filtration, in the context of this discussion and the claims will mean suction filtering and columnar filtering. In addition, any filtering means, that is commonly used and available for the filtering of such acids, may be used in this process.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A Chelating agent of formula;

comprising:
a polymer backbone having a plurality of carbon atoms; the chelating agent being water insoluble and hydrophobic; and
a plurality of reactive groups being coupled to separate carbon atoms of the backbone where n' is an integer greater than 1, wherein n=integer number of methylene groups; n'=integer number of monomer units; R=H; and R', R", R'''=alkyl, alkenyl, alkynyl, and aryl.

2. A Chelating agent of formula;

comprising:
a polymer backbone having a plurality of carbon atoms; the chelating agent being water insoluble and hydrophobic; and
a plurality of reactive groups being coupled to separate carbon atoms of the backbone where n' is an integer greater than 1, wherein n=integer number of methylene groups; n'=integer number of monomer units; R is a negative charge and R', R", R'''=alkyl, alkenyl, alkynyl, and aryl.

3. A Chelating agent of formula comprising:
a polymer backbone being a water insoluble, hydrophobic aliphatic polymer backbone;
a plurality of reactive groups being coupled to separate carbon atoms of the backbone where n' is an integer greater than 1, wherein n=integer number of methylene groups; n'=integer number of monomer units; R=H; and
the carboxylate groups are directly bound to the carbon atoms in the polymer backbone with said carbon atoms being separated by between zero and a plurality of carbon atoms.

4. A Chelating agent of formula comprising:
the polymer backbone being a water insoluble, hydrophobic aliphatic polymer backbone;

a plurality of reactive groups being coupled to separate carbon atoms of the backbone where n' is an integer greater than 1, wherein n=integer number of methylene groups; n'=integer number of monomer units; R is a negative charge; and the carboxylic acid groups are directly bound to the carbon atoms in the polymer backbone with the carbon atoms being separated by between zero and a plurality of carbon atoms.

5. The chelating agent as described in claim 1, wherein a measured amount of insoluble polymer, being one of the polymers from the group of polymers which includes poly(2-octadecyl-butanedioate) and Poly(2-octadecyl-butanedioic acid is added to a metal ion primary solution, and the heterogeneous mixture forms a secondary solution and the secondary solution is agitated at a predetermined cycle for a predetermined time, with the secondary solution then being gravity filtered, the filtered solution then being free of metal ions, with the poly/metal ion complex then being filtered out in the form of filter cakes containing the polymer and adsorbed metal ions.

* * * * *